No. 678,497. Patented July 16, 1901.
M. J. KILLEEN.
DRAFT EQUALIZER.
(Application filed Dec. 13, 1900.)

(No Model.)

Witnesses

Michael J. Killeen, Inventor.

BY C.A.Snow & Co.
Attorneys

UNITED STATES PATENT OFFICE.

MICHAEL J. KILLEEN, OF SAUK CENTER, MINNESOTA.

DRAFT-EQUALIZER.

SPECIFICATION forming part of Letters Patent No. 678,497, dated July 16, 1901.

Application filed December 13, 1900. Serial No. 39,747. (No model.)

*To all whom it may concern:*

Be it known that I, MICHAEL J. KILLEEN, a citizen of the United States, residing at Sauk Center, in the county of Stearns and State of Minnesota, have invented a new and useful Draft-Equalizer, of which the following is a specification.

This invention relates to draft appliances, and has for its object to provide for connecting a plurality of draft-animals to a vehicle or agricultural machine so that the animals will draw evenly thereon. It is furthermore designed to provide a compact arrangement of parts, so as to form a strong and durable device, to prevent looseness and jerking of the several draft connections, and to maintain a steady and even draft.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
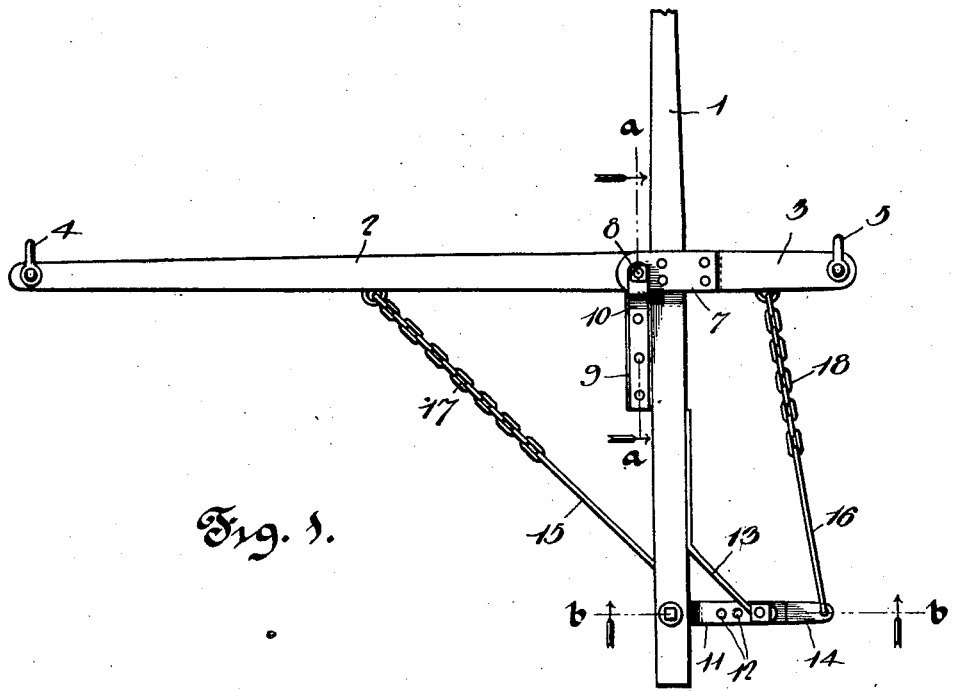
Figure 2:
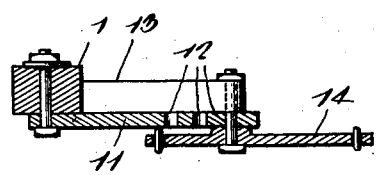
Figure 4:
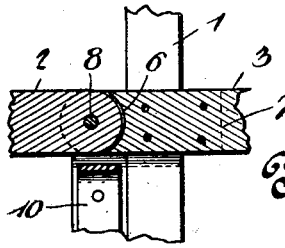
Figure 3:
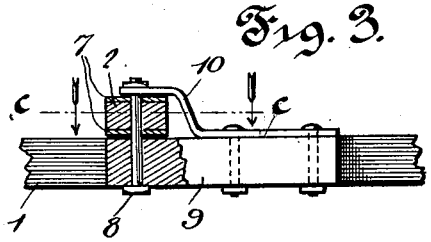

In the drawings, Figure 1 is a top plan view of a draft-equalizer constructed and arranged in accordance with the present invention. Fig. 2 is a detail sectional view taken on the line $b\ b$ of Fig. 1. Fig. 3 is a similar view taken on the line $a\ a$ of Fig. 1. Fig. 4 is a detail plan section taken on the line $c\ c$ of Fig. 3.

Like characters of reference designate corresponding parts in all of the figures of the drawings.

In carrying out the present invention I employ a support 1, preferably an ordinary draft tongue or pole, to which are fulcrumed the opposite laterally-projecting long and short draw-bars 2 and 3, respectively, having the draft connections 4 and 5 applied to their respective outer free ends. It is designed to provide the two draw-bars with a common fulcrum, which is accomplished by forming a concaved socket or recess 6 in the inner end of the short draw-bar, as best shown in Fig. 4 of the drawings, for the loose reception of the rounded or convexed inner end of the other draw-bar. Top and bottom longitudinally-projecting plates 7 are secured to the inner end of the short draw-bar, so as to overlap the adjacent end of the other bar, and are provided with corresponding perforations for the reception of a pivot-bolt 8, which also passes loosely through the inner end of the long draw-bar. A block 9 is secured to that side of the support or tongue which is next to the draw-bar 2, and the pivot or fulcrum bolt also passes through this block or lateral extension of the support. A suitable brace 10 is secured to the top of the block and is inclined upwardly and over the overlapped inner ends of the draw-bars, so as to connect with the upper end of the bolt.

In rear of the draw-bars and projected from the tongue or support and in the direction of the short draw-bar is an arm or bracket 11, having a plurality of perforations 12 and a forwardly-inclined brace 13, connected to the adjacent side of the tongue. This bracket or arm is for the support of an equalizing-lever 14, which is fulcrumed at one side of its middle to the under side of the bracket. The lever may be adjusted to any of the perforations in the arm or bracket, though ordinarily it is fulcrumed by the connection between the bracket and the brace 13, as plainly shown in Fig. 2 of the drawings. To the opposite ends of the lever are connected the respective draft rods or links 15 and 16, which are in turn connected to intermediate portions of the respective draw-bars by means of the chains 17 and 18, so as to form a flexible connection between the draw-bars and the equalizing-lever. It will be observed that the outer end portion of the equalizing-lever is the longer and the opposite inner end terminates short of the support or tongue. Moreover, the fulcrums of the equalizing-lever and the draw-bars are located at opposite sides of the longitudinal axis of the tongue or support. By having flexible connections between the draw-bars and the equalizing-lever the said bars may swing backwardly when the vehicle is being backed in order that said bars may not interfere with the draft-animals.

When the device is arranged for connection with a vehicle or agricultural implement without a pole or tongue, the support 1 should terminate at the draw-bars and a chain (not shown) employed to connect the fulcrum of the equalizing-lever to the front axle of the vehicle or implement.

What is claimed is—

In a draft-equalizer, the combination with a support, having front and rear lateral brackets at opposite sides thereof, a long draw-bar projecting laterally from the support in the direction of the front bracket, a short draw-bar projecting in the opposite direction, a common fulcrum connecting the inner ends of both bars to the front bracket, an equalizing-lever fulcrumed at the inner side of its middle to the rear bracket, and opposite flexible connections between the outer end of the lever and the intermediate portion of the short bar, and the inner end of the lever and the intermediate portion of the long bar, respectively.

In testimony that I claim the foregoing as my own I have hereto affixed my signature in the presence of two witnesses.

MICHAEL J. KILLEEN.

Witnesses:
M. HOGAN,
T. J. KILLEEN.